(12) United States Patent
Fujii et al.

(10) Patent No.: US 10,166,980 B2
(45) Date of Patent: Jan. 1, 2019

(54) VEHICLE MASS COMPUTATION

(71) Applicant: Ford Global Technologies, LLC, Dearborn, MI (US)

(72) Inventors: Yuji Fujii, Ann Arbor, MI (US); Nimrod Kapas, Canton, MI (US); Joseph F. Kucharski, Livonia, MI (US); Diana Yanakiev, Birmingham, MI (US); Eric Hongtei Tseng, Canton, MI (US); Jianbo Lu, Northville, MI (US); Gregory Michael Pietron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 978 days.

(21) Appl. No.: 13/780,948

(22) Filed: Feb. 28, 2013

(65) Prior Publication Data

US 2014/0244120 A1 Aug. 28, 2014

(51) Int. Cl.
*B62D 6/00* (2006.01)
*B60W 30/09* (2012.01)
(Continued)

(52) U.S. Cl.
CPC ............ *B60W 30/09* (2013.01); *B60W 10/06* (2013.01); *B60W 10/11* (2013.01); *B60W 40/13* (2013.01);
(Continued)

(58) Field of Classification Search
CPC ...... G01G 19/086; G01G 19/22; G01G 19/03; G01G 19/08; G06F 17/00; G06F 7/00
(Continued)

(56) References Cited

U.S. PATENT DOCUMENTS

| 5,659,304 A | 8/1997 | Chakraborty |
| 6,273,522 B1 | 8/2001 | Feetenby et al. |

(Continued)

FOREIGN PATENT DOCUMENTS

| JP | 5071622 A | 3/1993 |
| WO | 2006033612 A1 | 3/2006 |

OTHER PUBLICATIONS

Fathy et al. "Online vehicle mass estimation using recursive least squares and supervisory data extraction." in Proc. of 2008 American Control Conference. Seattle, WA WeC18.1.
(Continued)

*Primary Examiner* — Thomas G Black
*Assistant Examiner* — Wae L Louie
(74) *Attorney, Agent, or Firm* — James Dottavio; Brooks Kushman P.C.

(57) ABSTRACT

A vehicle having a drivetrain is controlled based on a difference between a torque transmitted by the drivetrain when the vehicle has constant non-zero speed and the torque transmitted by the drivetrain when the vehicle is accelerating. The drivetrain torque may be measured by a drivetrain torque sensor. The effective vehicle mass is computed from the torque difference. The computed mass of the vehicle is used to adjust the activation of a collision warning system or a collision avoidance system. A method of operating a vehicle where the activation of a collision avoidance system is adjusted based on a difference between a torque transmitted by a drivetrain when the vehicle has constant non-zero speed and the torque transmitted by the drivetrain when the vehicle is accelerating is disclosed. The torque difference is used to compute a vehicle mass that is used to adjust a collision warning distance.

8 Claims, 6 Drawing Sheets

(51) Int. Cl.
*B60W 10/06* (2006.01)
*B60W 10/11* (2012.01)
*B60W 40/13* (2012.01)
*B60W 50/14* (2012.01)
*B60W 50/00* (2006.01)

(52) U.S. Cl.
CPC ..... *B60W 50/14* (2013.01); *B60W 2050/0088* (2013.01); *B60W 2510/0657* (2013.01); *B60W 2520/30* (2013.01); *B60W 2530/10* (2013.01); *B60W 2550/308* (2013.01)

(58) Field of Classification Search
USPC ...... 701/31.1, 51, 64, 70; 702/142, 173, 175
See application file for complete search history.

(56) References Cited

U.S. PATENT DOCUMENTS

| | | | |
|---|---|---|---|
| 6,347,269 B1 * | 2/2002 | Hayakawa | G01G 19/086 701/51 |
| 6,436,005 B1 | 8/2002 | Bellinger | |
| 6,438,510 B2 | 8/2002 | Zhu et al. | |
| 6,546,329 B2 | 4/2003 | Bellinger | |
| 6,567,734 B2 * | 5/2003 | Bellinger | G01G 19/086 701/124 |
| 6,633,006 B1 * | 10/2003 | Wolf | B60T 8/172 177/136 |
| 6,859,712 B2 | 2/2005 | Walenty et al. | |
| 6,839,615 B2 | 6/2005 | Yanase | |
| 6,918,854 B2 | 7/2005 | Okada et al. | |
| 6,957,139 B2 | 10/2005 | Bellinger | |
| 6,980,900 B2 * | 12/2005 | Grieser | B60T 8/172 303/121 |
| 7,029,419 B2 | 4/2006 | Gessner | |
| RE39,134 E | 6/2006 | Ohnishi et al. | |
| 7,197,422 B2 | 3/2007 | Gaunt et al. | |
| 7,204,787 B2 | 4/2007 | Mackawa et al. | |
| RE39,684 E | 6/2007 | Ohnishi et al. | |
| 7,300,384 B2 | 11/2007 | Eriksson et al. | |
| 7,363,116 B2 | 4/2008 | Flechtner et al. | |
| 7,499,826 B2 * | 3/2009 | Huh | G01G 19/086 701/38 |
| 7,499,784 B2 | 5/2009 | Kresse | |
| 7,536,272 B2 | 5/2009 | Leminoux et al. | |
| 7,620,521 B2 * | 11/2009 | Breed | B60N 2/002 177/1 |
| 7,672,770 B2 | 3/2010 | Inoue et al. | |
| 7,739,021 B2 | 6/2010 | Wegeng et al. | |
| 7,739,023 B2 | 6/2010 | Lee | |
| 7,765,050 B2 | 7/2010 | Hrovat et al. | |
| 7,801,654 B2 | 9/2010 | Bai | |
| 7,818,140 B2 * | 10/2010 | Dreier | F16H 61/0213 177/136 |
| 7,865,296 B2 | 1/2011 | Ryu et al. | |
| 7,873,452 B2 | 1/2011 | Hawkins et al. | |
| 7,899,621 B2 * | 3/2011 | Breed | B60N 2/2863 340/995.1 |
| 7,966,115 B2 | 6/2011 | Bellinger | |
| 7,979,185 B2 * | 7/2011 | Wolfgang | G01G 19/086 701/1 |
| 8,050,856 B2 | 11/2011 | Duty et al. | |
| 8,068,964 B2 | 11/2011 | Wolfgang et al. | |
| 8,095,286 B2 | 1/2012 | Wolfgang | |
| 8,108,096 B2 * | 1/2012 | Dlugoss | G01L 25/003 477/906 |
| 8,112,212 B2 | 2/2012 | Bauerle | |
| 8,725,324 B2 * | 5/2014 | Jung | G01M 17/08 701/19 |
| 2001/0001138 A1 | 5/2001 | Zhu et al. | |
| 2003/0040861 A1 | 2/2003 | Bellinger et al. | |
| 2004/0006421 A1 | 1/2004 | Yanase | |
| 2005/0010356 A1 * | 1/2005 | Ishiguro | F16H 59/52 701/124 |
| 2006/0080023 A1 * | 4/2006 | Hrovat | B60K 28/16 701/82 |
| 2006/0149424 A1 | 7/2006 | Hecker et al. | |
| 2007/0043491 A1 * | 2/2007 | Goerick | B60K 28/165 701/41 |
| 2007/0152804 A1 * | 7/2007 | Breed | B60N 2/2863 340/435 |
| 2008/0126009 A1 * | 5/2008 | Huh | G01G 19/086 702/175 |
| 2008/0154629 A1 * | 6/2008 | Breed | B60N 2/2863 705/1.1 |
| 2008/0319610 A1 * | 12/2008 | Oechsle | B60R 21/0134 701/41 |
| 2009/0102277 A1 | 4/2009 | Ezoe et al. | |
| 2009/0192760 A1 | 7/2009 | Dreier et al. | |
| 2010/0049415 A1 | 2/2010 | Bauerle | |
| 2010/0185370 A1 | 7/2010 | Wurthner et al. | |
| 2010/0305822 A1 | 12/2010 | Kresse et al. | |
| 2010/0312492 A1 | 12/2010 | Fryk et al. | |
| 2010/0332049 A1 | 12/2010 | Sy et al. | |
| 2011/0004382 A1 | 1/2011 | Dreier et al. | |
| 2011/0015808 A1 | 1/2011 | Dreier et al. | |
| 2011/0035129 A1 * | 2/2011 | Yasui | B60T 8/17558 701/70 |
| 2011/0066322 A1 * | 3/2011 | Karlsson | G01G 19/086 701/33.4 |
| 2011/0112735 A1 | 5/2011 | Takaishi et al. | |
| 2011/0172877 A1 * | 7/2011 | Dourra | F16H 59/52 701/33.4 |
| 2011/0218764 A1 | 9/2011 | Fujita et al. | |
| 2011/0295474 A1 | 12/2011 | Ma et al. | |
| 2012/0029776 A1 | 2/2012 | Staudinger et al. | |
| 2012/0046840 A1 | 2/2012 | Monsere et al. | |
| 2012/0296549 A1 * | 11/2012 | Adams | G07C 5/008 701/102 |
| 2013/0218396 A1 * | 8/2013 | Moshchuk | B60W 50/08 701/25 |
| 2014/0244120 A1 * | 8/2014 | Fujii | B60W 10/06 701/58 |

OTHER PUBLICATIONS

Sandu et al. "Modeling multibody systems with uncertainties. Part I: Theoretical and computational aspects." Multibody System Dynamics. 15:373-395. 2006.

Rozyn, M. and Zhang, M. "A method for estimation of vehicle inertial parameters." Vehicle System Dynamics: International Journal of Vehicle Mechanics and Mobility. 48:5, 547-565.2010.

Druzhinina et al. "Speed gradient approach to longitudinal control of heavy-duty vehicles equipped with variable compression brake." IEEE Transactions on Control Systems Technology. 10:309-220. 2001.

Vahidi et al. "Recursive least squares with forgetting for online estimation of vehicle mass and road grade: theory and experiments." Vehicle System Dynamics: International Journal of Vehicle Mechanics and Mobility, 43:1, 31-55. 2005.

McIntyre et al. "A Two-Stage Lyapunov-Based Estimator for Estimation of Vehicle Mass and Road Grade." IEEE Transactions on Vehicular Technology. 58(7):3177-3185.2009.

Cheng. C and Cebon D. "Parameter and state estimation for articulated heavy vehicle." Vehicle System Dynamics: International Journal of Vehicle Mechanics and Mobility, 49:1-2, 399-418.2011.

* cited by examiner

VEHICLE MASS COMPUTATION

TECHNICAL FIELD

This disclosure relates to systems and methods for controlling a vehicle based on an estimate of the mass of the vehicle.

BACKGROUND

Many vehicle control systems can benefit from an accurate estimation of the vehicle mass. Vehicle mass can change based on cargo and number of passengers. Vehicle mass may be affected by the attachment of a trailer to the vehicle. A vehicle mass estimation may be particularly useful for cargo carrying vehicles such as trucks and vans. Vehicle mass estimation is also useful for passenger vehicles in which the number of passengers may change during a trip. Better control can be achieved when vehicle mass is known. For example, systems such as powertrain and braking can provide more accurate control when vehicle mass is accurately known. As a result, safety and performance may be improved.

Vehicle stopping distance can be greatly affected by vehicle mass. A heavily loaded vehicle will have a longer stopping distance for a given applied braking force than an unloaded vehicle. A useful application for a vehicle mass estimation algorithm may be in a collision warning or avoidance system. A collision warning or avoidance system may calculate the stopping distance between the vehicle and an obstacle in the vehicle's path. The stopping distance is affected by the vehicle mass. Accurate estimation of the vehicle mass can improve the safety and performance of such systems.

SUMMARY

A vehicle is disclosed that is comprised of a drivetrain and one or more controllers programmed to control the operation of the vehicle based on a torque transmitted by the drivetrain measured when the vehicle has constant non-zero speed and the torque transmitted by the drivetrain measured when the vehicle is accelerating. Further, the measured torques are used to compute a mass of the vehicle. The calculation of the vehicle mass is accomplished by taking the difference between the measured torques. A vehicle further comprising a collision warning system and a collision avoidance system is disclosed that adjusts the activation of the collision warning system and the collision avoidance system based on the computed vehicle mass.

A vehicle is disclosed that is comprised of a drivetrain and one or more controllers programmed to control the operation of the vehicle based on a difference between a torque transmitted by the drivetrain when the vehicle has constant non-zero speed and the torque transmitted by the drivetrain when the vehicle is accelerating. The vehicle may further comprise a torque sensor configured to measure the above torques and the one or more controllers are programmed to operate with the torque sensor. Further, the measured torques are used to compute a mass of the vehicle. A vehicle further comprising a collision avoidance system whose activation is adjusted based on the computed mass of the vehicle is disclosed. A vehicle further comprising a collision warning system whose activation is adjusted based on the computed mass of the vehicle is disclosed.

A method for operating a vehicle comprising adjusting the activation of a collision avoidance system based on a difference between a torque transmitted by a drivetrain when the vehicle has constant non-zero speed and the torque transmitted by the drivetrain when the vehicle is accelerating is disclosed. The difference in torques is used to compute a mass of a vehicle. The method further comprises the step of using the computed mass of the vehicle to adjust a collision warning distance. A further step comprises comparing the collision warning distance to a distance to an obstacle to generate a driver warning or to decelerate the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
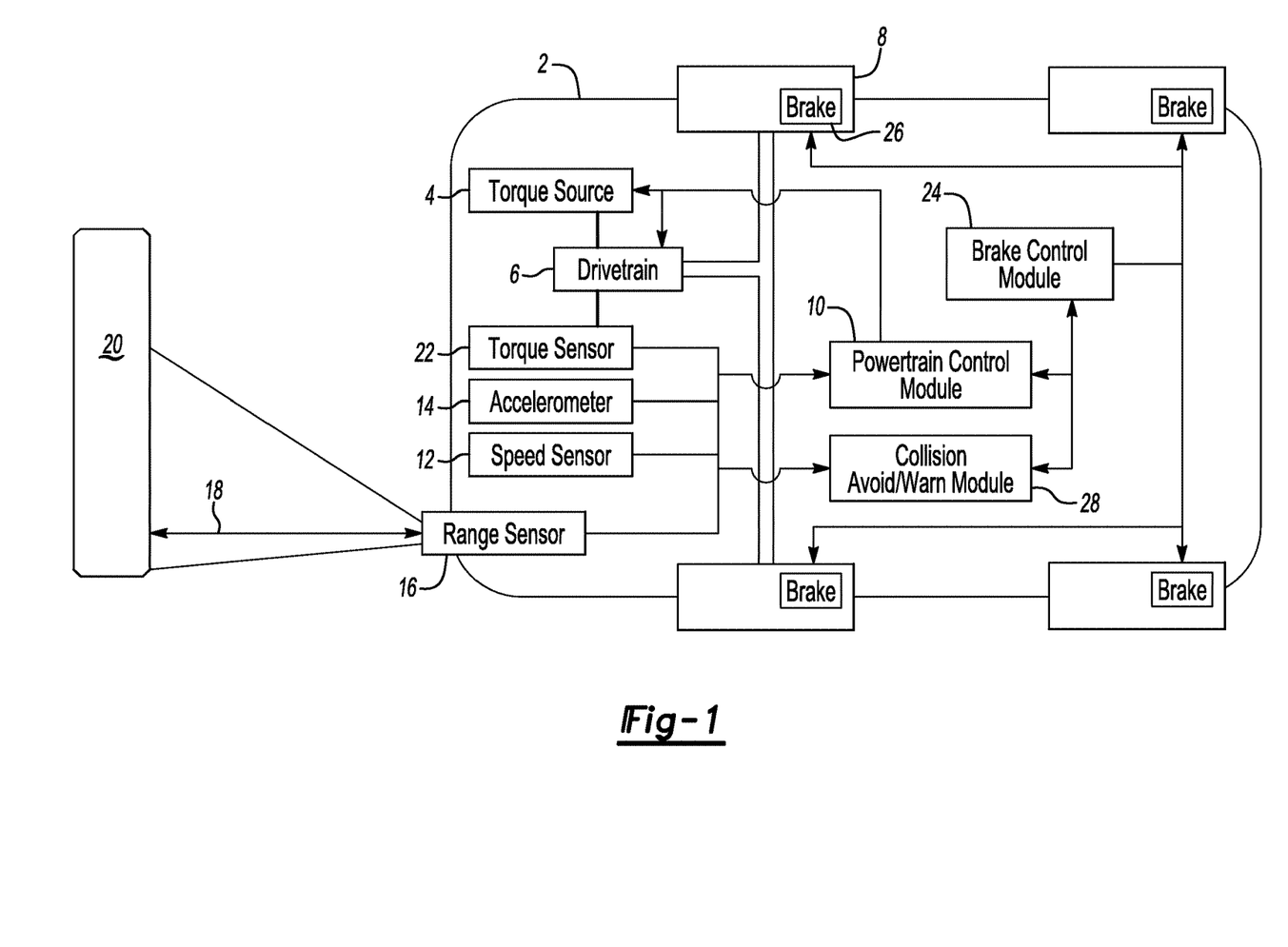
FIG. 1 is a block diagram illustrating a typical vehicle with a powertrain and a collision detection system.

FIG. 1 is an example of an automotive vehicle system 2 equipped with a drivetrain torque sensor 22. A powertrain system includes a torque source 4 for providing a drive torque for vehicle propulsion. The torque source 4 may be an internal combustion engine or an electric motor. A drivetrain 6 transmits a drive torque from the torque source 4 to the wheels 8. A typical function of the drivetrain 6 may be to match the torque/speed characteristics of the torque source 4 to the wheel 8 torque/speed characteristics demanded by the driver. The drivetrain 6 may include a conventional step-ratio transmission, a continuously variable transmission (CVT) or a hybrid transmission.

A vehicle may have one or more controllers that measure and process inputs to generate control outputs to control a function of the vehicle. A powertrain control module (PCM) 10 may monitor driving conditions using various sensor devices. The sensor devices may be input directly or indirectly to the PCM 10. Sensor inputs may be received by the PCM 10 from other modules in the vehicle. The sensor devices monitored may be a speed sensor 12 for monitoring vehicle speed, an accelerometer 14 for measuring vehicle acceleration and a range sensing device 16 for measuring a distance 18 to an object 20 in front of the vehicle 2. The range sensor 16 may be a radar-based or a vision-based system. The speed sensor 12 may include one or more wheel speed sensors that measure the speed of the wheels 8.

One or more torque sensors 22 may be positioned within the drivetrain system for measuring a torque that is transmitted by the drivetrain. The torque sensor 22 may measure the torque at the input, output or some intermediate position of the drivetrain 6. The PCM 10 may calculate an effective vehicle mass based on the measurements from the sensors (12, 14, 22). The effective vehicle mass estimate may account for the effects of vehicle weight, occupants, a trailer and other drive resistance factors. Further, a brake control module (BCM) 24 may adjust control actions of the brakes 26 based on the effective vehicle mass. Sensor values and vehicle mass values may be transferred between the BCM 24 and the PCM 10. In addition, the vehicle mass calculation may be transferred to other control modules that may be present in the vehicle. A Collision Avoidance Module or Collision Warning Module 28 may be present in the vehicle to control the operation of the vehicle during certain conditions. The Collision Avoidance/Warning Module may receive inputs from the sensors (12, 14, 16, 22) and communicate with the PCM 10 and BCM 24.

The effective mass computation method may be based on a lumped system representation of a vehicular system. More specifically, the vehicular system, including everything on board or attached to the vehicle, may be considered a single mass object at its center of gravity. The vehicle translational motion may be described through an equation as follows:

$$(M_v + M_I)A_V = F_D - F_{DR} \quad (1)$$

$M_V$ is the effective vehicle mass that represents a mass of the vehicle itself, occupants, and any cargo present. $M_V$ also includes the effects of a trailer on overall vehicle motion. $M_I$ represents the inertial effects of rotating components within the driveline system whose inertial torque may affect the translational motion. $A_V$ is the vehicle acceleration that may be measured using an accelerometer 14. Alternatively, $A_V$ may be computed by taking a derivative of speed measurements 12. $F_D$ is the drive force at the wheels, while $F_{DR}$ represents the overall drive resistance that may include road load and aerodynamic resistance. $F_D$ can be expressed in terms of the torque transmitted by the drivetrain, $T_D$, measured at a given location using the torque sensor 22 as follows:

$$F_D = \frac{R\varepsilon}{r} T_D \quad (2)$$

where R is an overall torque ratio between the location of the torque measurement and a wheel axle, ε is driveline efficiency, and r is the wheel radius. Substituting equation (2) into equation (1) yields:

$$(M_v + M_I)A_V = \frac{R\varepsilon}{r} T_D - F_{DR} \quad (3)$$

Equation (3) can be reduced to the following form when the vehicle is at a steady state or when $A_V$ is near zero:

$$F_{DR} = \frac{R\varepsilon}{r} T_{DR} \quad (4)$$

where $T_{DR}$ is defined as the torque measurement or estimate, $T_D$, when the vehicle acceleration, $A_V$, is at or near zero. $T_{DR}$ may be measured under various steady state conditions and stored in the PCM 10 as a look-up table, typically, as a function of vehicle speed. Note that values for $T_{DR}$ at various speeds may be determined during vehicle development and an initial map of values may be preloaded into the PCM 10. The $T_{DR}$ values may also be updated in real-time during a drive cycle whenever steady state conditions are realized. A real-time update may allow a more accurate realization for the drive resistance over the life of the vehicle. For example, drive resistance may be affected by the tire rolling resistance which may change when the tires are replaced. The ability to update the drive resistance in real-time during a drive cycle may allow any changes in the drive resistance to be reflected in the control strategy.

Substituting equation (4) into equation (3) results in $$M_v = \frac{R\varepsilon}{r} \frac{(T_D - T_{DR})}{A_v} - M_I \quad (5)$$

Equation (5) forms a foundation for computing $M_V$ in real-time based on measurements of $T_D$ and $A_V$. Parameters R and r can be pre-determined based on drivetrain design geometry. Efficiency ε may be empirically obtained for a given driveline system. $M_I$ can be identified at each gear ratio, accounting for the inertia of all rotating components.

Using equation (5) as the basis for computing the vehicle mass, the drivetrain torque, $T_D$, may be measured or estimated at a given time. Values for the drive resistance, $T_{DR}$, can be retrieved based on the current operating condition of the vehicle (vehicle speed for example). Other values in equation (5) may be predetermined or determined at run-time using other methods. The effective vehicle mass may then be computed by applying equation (5). To prevent division by zero, the vehicle mass computation may be performed when $A_V$ is above a certain threshold, meaning that the vehicle must be accelerating. A minimum vehicle speed may also be defined for performing the vehicle mass computation. It may also be desirable that the brakes are not applied when the vehicle mass computation is in progress.

The algorithm described may also work without measurement from a torque sensor 22. The algorithm can work with an estimate of the drivetrain torque. For example, an estimate of the drivetrain torque may be derived from an estimated engine torque. However, more accurate results may be obtained when data from a drivetrain torque sensor is used.

Figure 2:
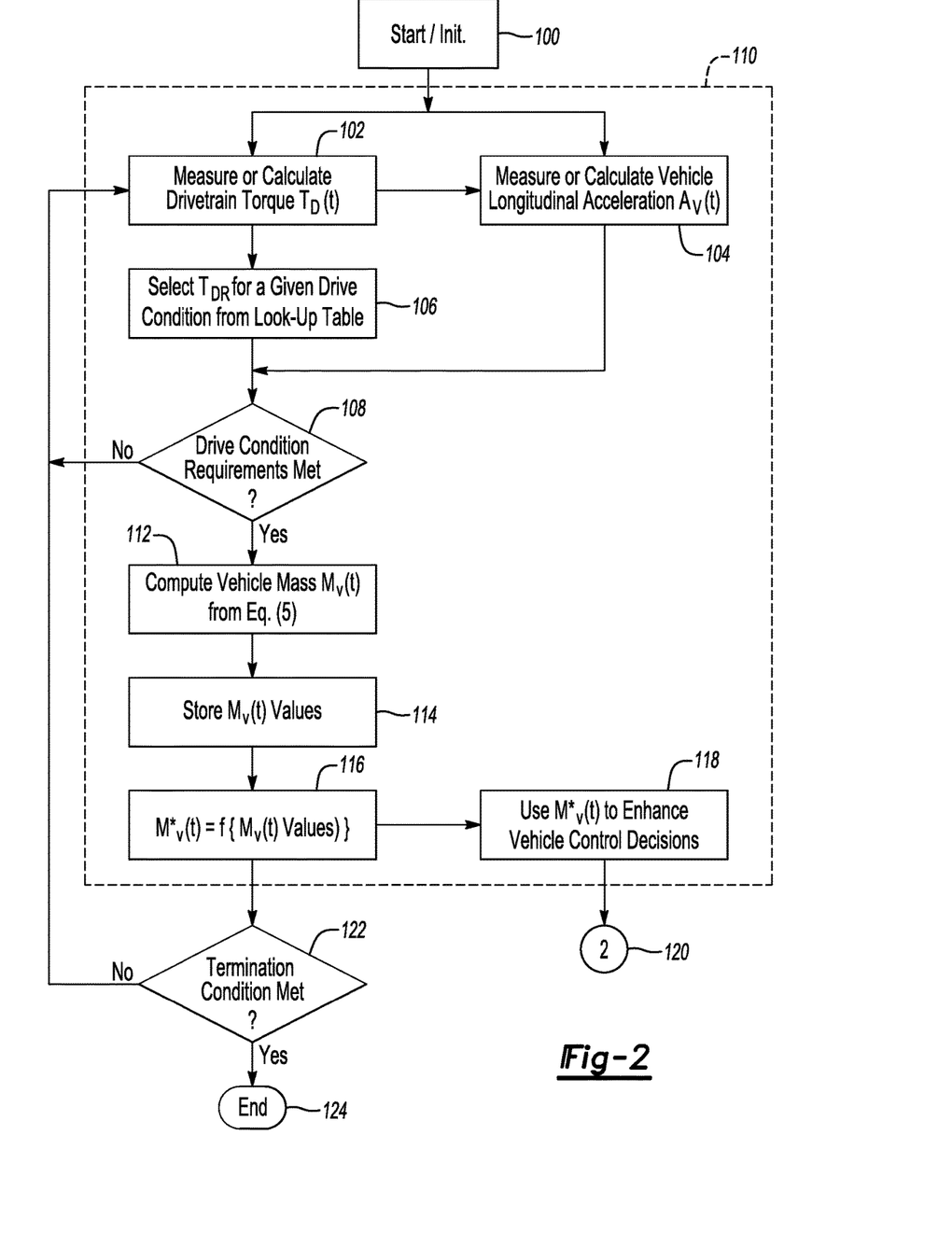
FIG. 2 is a flow chart illustrating one possible implementation of the method for estimating vehicle mass.

FIG. 2 shows a flow chart for one possible embodiment of the method for computing an effective vehicle mass using a drivetrain torque sensor. The algorithm starts by initializing any timers, counters, variables and parameters that may be used 100. The torque that is transmitted by the driveline, $T_D$, is measured or calculated 102. The torque measurements, $T_D$, may be low-pass filtered with a relatively low cut-off frequency such as 5 Hz. The method described does not rely on the detection of fast transient behaviors. Vehicle longitudinal acceleration, $A_V$, may be measured 104 using an accelerometer sensor. Acceleration signals, $A_V$, may be filtered similar to the torque signals. Alternatively, vehicle acceleration may be determined by taking a derivative of vehicle speed signals sampled at different time steps if the vehicle is on a level surface. Drive resistance torque, $T_{DR}$, may be determined 106 from a look-up table of $T_{DR}$ for a given vehicle speed. The look-up table of $T_{DR}$ may include other vehicle conditions as table parameters and is not necessarily limited to just vehicle speed.

If the vehicle drive conditions meet a certain set of requirements 108, the effective vehicle mass, $M_V$, may be computed 112 based on $T_D$, $T_{DR}$ and $A_V$ according to equation (5). If the requirements are not met, the mass computation algorithm 110 may be repeated. The vehicle drive condition 108 may be that the vehicle is accelerating. The vehicle drive conditions 108 may include a minimum velocity and a minimum acceleration to ensure an accurate mass calculation. The vehicle drive conditions 108 may also include a condition that the wheel brakes are neither partially nor fully engaged during the mass calculation. The vehicle drive conditions 108 may be used to ensure that the drivetrain torque and vehicle acceleration are in an acceptable range to allow for an accurate calculation of vehicle mass. As previously explained, model parameters R, r, ε and $M_I$ in equation (5) may be pre-determined based on drivetrain component geometry and testing.

The vehicle mass values, $M_V$, may be stored for later use 114. Stored values may include a number of the most recent vehicle mass calculations. The current and previous calculated vehicle mass values may be combined together 116 through a pre-determined function to compute a statistical average $M^*_V$. The average effective vehicle mass, $M^*_V$, may be utilized by any vehicle control modules to make various control decisions 118 and to initiate control actions 120. If a pre-determined termination condition is met 122, the algorithm may end 124. The termination condition 122 may be a fixed time period or specific termination criteria may be defined. Otherwise, the mass computation 110 may be repeated.

Figure 3:
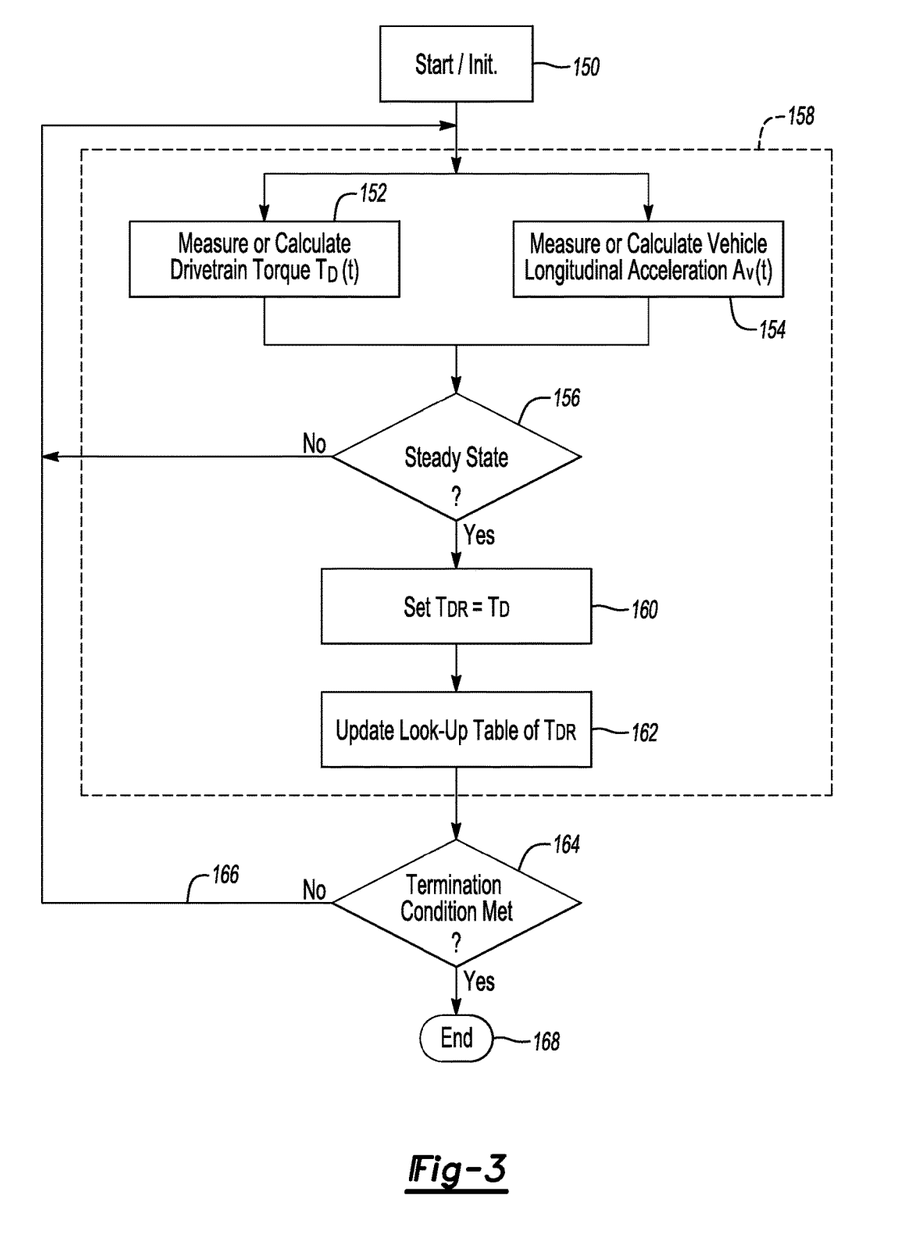
FIG. 3 is a flow chart illustrating one possible implementation of the method for calculating the drive resistance torque.

One possible method to construct the drive resistance torque, $T_{DR}$, lookup table is described in FIG. 3. At the start of the algorithm 150, any timers, counters, variables and parameters may be initialized. The driveline torque, $T_D$, may then be measured or calculated 152. The torque measurements may be low-pass filtered with a relatively low cut-off frequency such as 5 Hz. Vehicle longitudinal acceleration, $A_V$, may be measured or calculated 154 using an accelerometer sensor. Acceleration signals may be filtered similar to the torque signals. Alternatively, vehicle acceleration may be determined 154 by taking a derivative of vehicle speed signals that are sampled at different time steps.

The logic may then determine if the vehicle may be operating in a steady state condition 156. A steady state condition may be one in which the vehicle is traveling at a constant non-zero speed. If the magnitude of vehicle acceleration, $|A_V|$, is less than a pre-determined threshold value, $a_v$, the vehicle may be considered to be at a steady state driving condition. If $|A_V|$ is larger than $a_v$, the vehicle may be considered to be operating under transient conditions. If the vehicle is suspected to be in other than a steady-state condition, the drive resistance torque will not be calculated in that time interval. The steady state vehicle conditions 156 may include a minimum velocity condition. The steady state vehicle conditions 156 may also include a condition that the wheel brakes are neither partially nor fully engaged during the mass calculation.

If the vehicle is in a steady-state condition, then the drive resistance torque, $T_{DR}$, may be equated 160 to the measured or calculated drivetrain torque, $T_D$, that is transmitted by the drivetrain. The calculated drive resistance, $T_{DR}$, may then be utilized to update a look-up table 162. The look-up table may be stored for later use in the vehicle mass estimation. The look-up table may be defined as a function of vehicle speed, V, or any other desired index. Alternatively, $T_{DR}$ may take a functional form such as a polynomial equation:

$$T_{DR}(V) = \Sum_{k=0}^{n} c_k V^k \qquad (6)$$

where V is vehicle velocity, n is the order of the polynomial and $c_k$ is its coefficient. In this representation, the coefficients $c_k$ (k=1, 2, . . . , n) may be updated 162 to match the measured torque, $T_D$, and the measured velocity, V.

After updating the look-up table of $T_{DR}$ 162, if a pre-determined termination condition is met 164, the algorithm may terminate 168. The termination criteria may be vehicle power off or a fault condition, but is not limited to these. If the termination condition 164 is not satisfied, the drive resistance algorithm can be repeated 158. The determination of the drive resistance torque table may be performed as a calibration procedure or may be run in real-time.

Existing methods of calculating vehicle mass may use statistical recursive estimation algorithms to converge on a vehicle mass estimate since actual drivetrain torque is typically not measured. Detailed models of the vehicle may be used and a recursive least-squares algorithm may be employed to estimate the values of the model. One of the estimated states of the model may be vehicle mass. A disadvantage of such models is that some parameters must be known in advance. Parameters such as aerodynamic drag and rolling resistance must be available in advance. Since measured drivetrain torque is not available and parameters must be known in advance, the estimated vehicle mass may be inaccurate. Another drawback of recursive estimation algorithms is that they may cause a large computational load and are not preferred for real-time implementation. The disclosed method provides a method of measuring the drive resistance torque with no requirement that the associated parameter values be known in advance. The disclosed method is based on algebraic equations and requires less computational load.

The methods shown in FIGS. 2 and 3 may be programmed into a controller. The controller may communicate with other controllers to control the operation of the vehicle. The vehicle mass computation may be used to perform vehicle control functions. The vehicle mass may be used in a collision warning system or in a collision mitigation system. The computed vehicle mass may be used to calculate a stopping distance to an obstacle. Other vehicle control functions may benefit from the computed vehicle mass. The vehicle mass value may be used to control the ride height of the vehicle by adjusting a suspension system based on vehicle mass. The braking system may use the value to control front to rear brake proportioning or to control the deceleration of the vehicle. The powertrain controller may use vehicle mass to adjust the engine control or transmission shift points. Many vehicle control functions may use the vehicle mass computation, and this description is not limited to those described.

Figure 4:
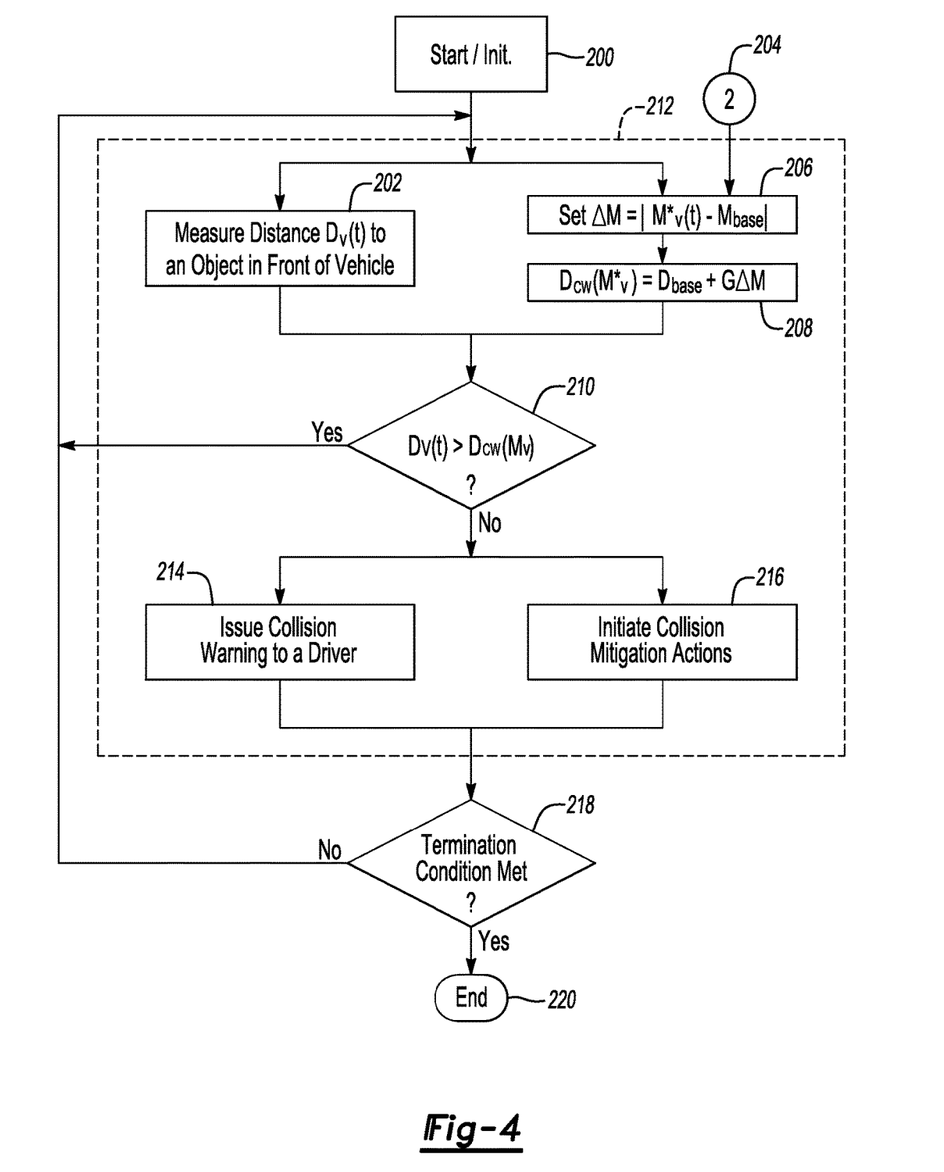
FIG. 4 is a flow chart illustrating one possible implementation using the estimated vehicle mass for a collision warning/mitigation system.

FIG. 4 shows a flow chart that illustrates one possible embodiment for adjusting a collision warning distance, $D_{CW}$, based on the effective vehicle mass, $M^*_V$, and issuing a collision warning signal based on collision warning distance, $D_{CW}$. The algorithm starts by initializing any timers, counters, variables and parameters 200. Next the distance, $D_V$, to a frontal object is measured using a range sensor 202. The average effective vehicle mass, $M^*_V$, computed through the algorithm described in FIG. 2 is received 204 by the collision warning logic 212. The incremental mass, $\Delta M$, is computed 206 as a difference between the calculated vehicle mass, $M^*_V$, and a baseline mass, $M_{base}$, where $M_{base}$ may be defined as the curb weight of the vehicle. The collision warning distance, $D_{CW}$, may be adjusted 208 in proportion to the incremental mass, $\Delta M$, through $$D_{CW}(M^*_v) = D_{base} + G\Delta M \qquad (7)$$

where G may be a constant or a variable gain and $D_{base}$ may be a pre-determined baseline collision warning distance that corresponds to $M_{base}$.

If the current distance measurement, $D_V$, is larger than the collision warning distance, $D_{CW}$, 210, the algorithm will repeat the algorithm 212. If $D_V$ is equal to or smaller than $D_{CW}$, a collision warning signal may be issued to a vehicle occupant 214 and collision mitigation actions may be initiated 216. Although the specific nature of the collision mitigation actions is outside the scope of this invention, it may include pre-charging of a brake actuation system. The collision mitigation actions may also include applying the brakes of the vehicle or reducing the throttle input to the powertrain. If any pre-determined termination conditions are met 218, the algorithm may terminate 220. An example of the termination condition may be when vehicle speed is below a pre-determined threshold, indicating a stationary vehicle condition. If the termination conditions 218 are not satisfied, the steps of method 212 may be repeated.

Figure 5:
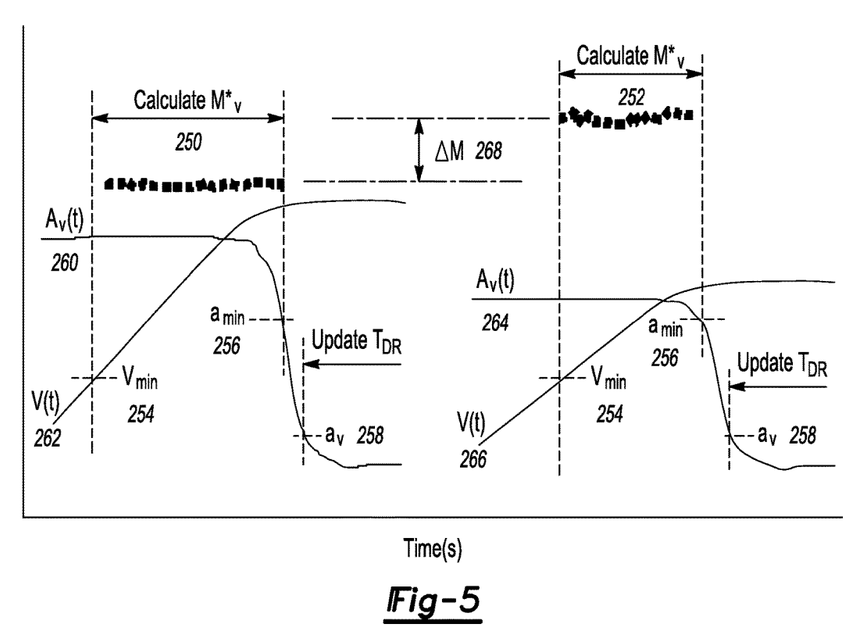
FIG. 5 is a graph illustrating one possible signal behavior for an unloaded and loaded vehicle during the vehicle mass calculation.

FIG. 5 graphically illustrates the effective vehicle mass and drive resistance calculation methods, according to the method described in FIGS. 2 and 3, for an unloaded vehicle 250 and a loaded vehicle 252. The algorithm computes vehicle mass 250 when certain vehicle conditions are satisfied. In this example, the mass may be computed every 10 msec when the vehicle speed, V(t), 262 exceeds a threshold, $V_{min}$, 254. The algorithm may use the drive resistance, $T_{DR}$, as a function of vehicle speed, V(t), 262 that may be stored as a look-up table based on previous drive cycle data. When the vehicle acceleration, $A_V(t)$, 260 decreases below a threshold, $a_{min}$, 256, the algorithm may stop performing the mass calculation. When vehicle acceleration, $A_V$, 260 drops further below another threshold, $a_s$, 258 indicating a steady-state condition, the algorithm may update the look-up table of drive resistance torque, $T_{DR}$, using the measured drivetrain toque, $T_D$. In the case of trailer towing 252, the algorithm works in a similar manner but the values may be different due to the added mass. The acceleration signal, $A_V(t)$, 264 and vehicle speed signal, V(t), 266 may be different in the case of a loaded vehicle. In the loaded vehicle case, the drivetrain torque, $T_D$, necessary to achieve the same acceleration as the unloaded vehicle should be greater because of the larger mass. In FIG. 5, the difference in calculated mass between the loaded and unloaded vehicle is shown as $\Delta M$ 268.

Figure 6:
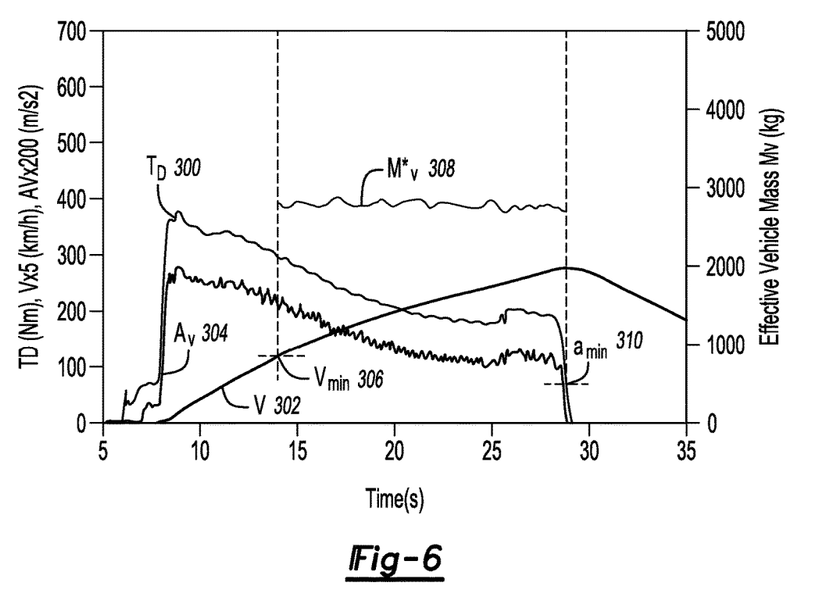
FIG. 6 is a graph illustrating possible signal behavior during the vehicle mass calculation for an unloaded vehicle in which the vehicle mass calculation is performed until acceleration has decreased below a threshold.

FIG. 6 shows an example of the vehicle mass calculation method according to the disclosed method. The effective mass of a truck (without a trailer) was computed during its launch at a 20% throttle level. The weight of the vehicle, including occupants, was measured on a truck weighing scale as a reference and was found to be 2785 kg. The vehicle was equipped with an automatic transmission that included an input shaft torque sensor. FIG. 6 shows the measured torque, $T_D$, 300, measured vehicle speed, V, 302, and measured vehicle acceleration, $A_V$, 304, collected during a vehicle launch. Both $T_D$ 300 and $A_V$ 304 were low-pass filtered with a 5 Hz cut-off frequency. When the vehicle speed, V, 302 exceeded the pre-determined threshold, $V_{min}$, 306 (24 kph or 15 mph in this example), the effective mass, $M^*_V$, 308 was computed following the method of FIG. 2. The method terminated the mass calculation when the acceleration level, $A_V$, 304 dropped below the pre-determined threshold, $a_{min}$, 310 (0.25 m/s2 in this example). The computed mass, $M^*_V$, 308, whose scale is shown on the right hand side, was close to the measured mass of 2785 kg— demonstrating the effectiveness of the described method.

Figure 7:
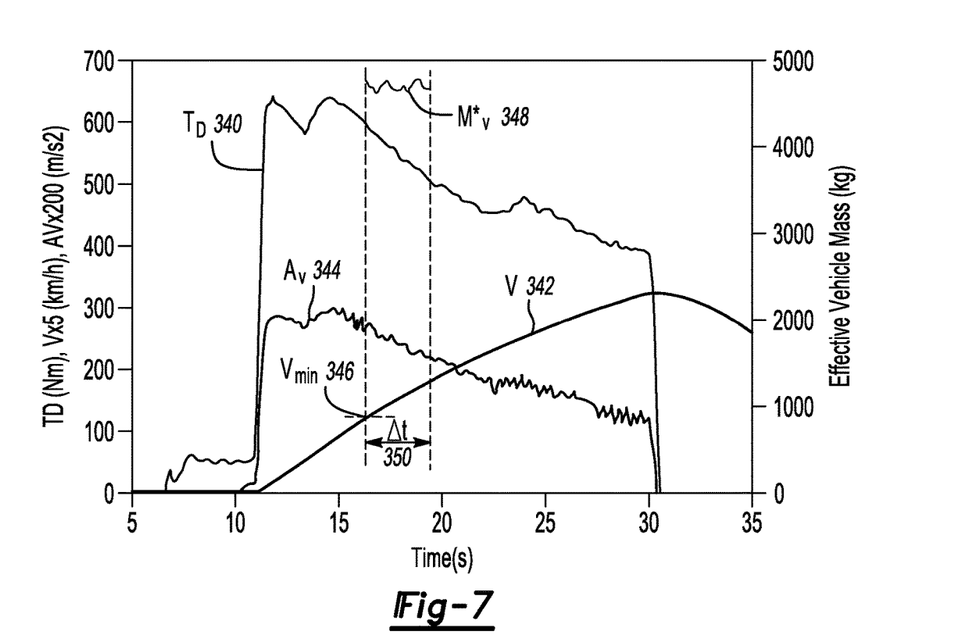
FIG. 7 is a graph illustrating possible signal behavior during the vehicle mass calculation for a loaded vehicle in which the vehicle mass calculation is performed for a pre-determined time interval.

FIG. 7 shows an example of the vehicle mass calculation method according to the described method for the same truck with a trailer during a 30% throttle launch. The total weight of the vehicle, including occupants and the trailer, was measured prior to data collection as a reference and was found to be 4454 kg. FIG. 7 shows the measured torque, $T_D$, 340, measured vehicle speed, V, 342, and measured vehicle acceleration, $A_V$, 344 collected during the vehicle launch. Both $T_D$ 340 and $A_V$ 344 were low-pass filtered with a 5 Hz cut-off frequency. When the vehicle speed V 342 exceeded a pre-determined threshold, $V_{min}$, 346 (24 kph or 15 mph in this example), the effective mass, $M^*_V$, 348 was computed following the method in FIG. 2. In this example, the method terminated the mass calculation when the pre-determined time interval, $\Delta t$ 350, (3 seconds in this example) had elapsed. The computed mass, $M^*_V$, 348, whose scale is shown on the right hand side, was very close to the measured mass of 4454 kg.

A further disadvantage of using a traditional recursive estimation algorithm is that longer time periods may be needed in order for the estimates to converge to the final values. In addition, the presence of any noise in the measured signals may delay the convergence of the estimates or result in erroneous convergence. Signals such as acceleration may be noisy due to road surface conditions or powertrain disturbances. Once it converges into an erroneous value, it is generally difficult to re-converge into a correct value because the current estimate is based on continual adjustment of previous values through recursive estimation process. Another disadvantage of the conventional recursive algorithm is that it is difficult to re-converge to a new value, when a vehicle is loaded or unloaded, after it converges to a certain mass value. The disclosed method is capable of converging quickly and may also be selectively performed only when there is no noise present on the measurement signals. The disclosed method does not require that the method be performed continuously. One may choose specific intervals in which to perform the method—possibly intervals in which no noise is present on the measurement signals. The quick convergence of the disclosed method enables multiple mass calculations independently from each other within a drive cycle, allowing the use of conventional statistical outlier rejection tests to readily identify and remove erroneous mass estimates.

It is evident that the effective mass computed according to this description can be utilized to enhance various vehicle control actions, including the adjustment of collision mitigation distance described above. This example demonstrated that certain of the disclosed methods require only short time duration to compute the effective vehicle mass unlike prior-art methods that require much longer data sampling duration because of their primary dependence on acceleration measurements without torque measurements.

Figure 8:
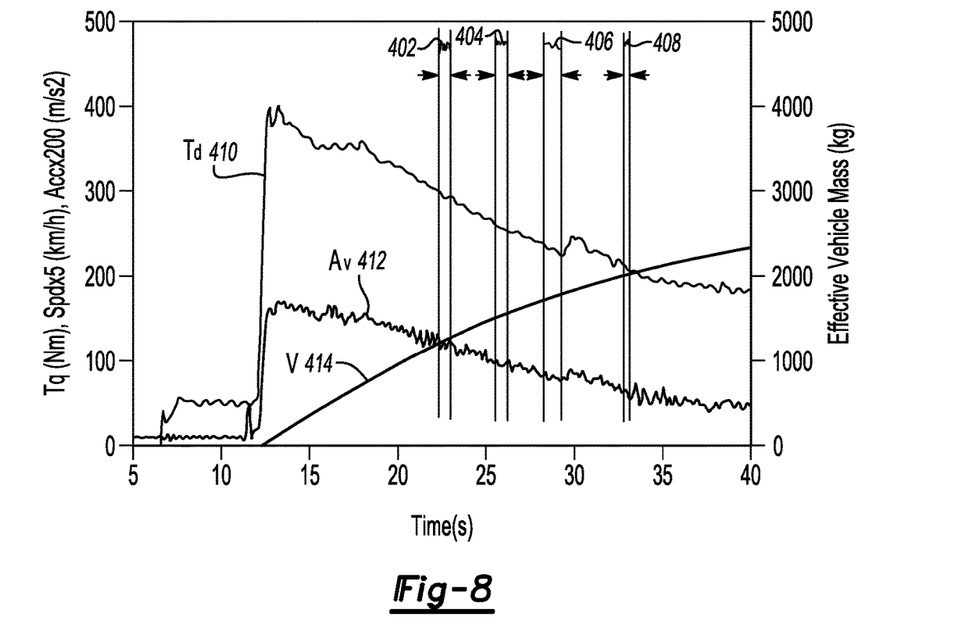
FIG. 8 is a graph illustrating a possible variation of the vehicle mass calculation in which the mass calculation is performed during variable time intervals.

FIG. 8 shows an example in which the vehicle mass calculation is performed during short intervals when conditions are stable. The disclosed method may impose very narrow drive conditions upon the vehicle mass calculation. Time periods where signal measurements are stable and noise-free may be chosen without concern to convergence issues. The system may determine periods where the torque measurement, $T_d$, 410 and the acceleration, $A_V$, 412 are at a preferred noise level. The vehicle mass calculation may be performed for a pre-determined period of time or for the duration when the signals are deemed to be of sufficient quality. In FIG. 8, the vehicle mass calculation is performed in the intervals 402, 404, 406 and 408. This example depicts a case in which the calculation interval is variable, but the time intervals may also be defined to be the same. Vehicle mass estimates from the intervals may be averaged or filtered.

It should be understood that these algorithms are not limited to the exact mass calculation and collision warning methods that have been illustrated and discussed in this disclosure, but that various modifications may be made without departing from the spirit and the scope of the invention. For example, corrections may be added to the disclosed method to account for a surface grade level that affects sensory data and vehicle behaviors. More specifically, when the vehicle is moving uphill on a surface with a grade angle, θ, a part of drive torque, $T_D$, is working against the gravitational force. Thus, $T_D$ may not be directly utilized to update the drive resistance table $T_{DR}$. Vehicle speed, V, and acceleration, $A_V$, have the following relationship when the vehicle is traveling on surface grade, θ:

$$|A_V| = \frac{dV}{dt} + g\sin\theta \qquad (8)$$

where g is the gravitational constant. To ensure that $T_D$ is not significantly influenced by a non-zero grade, the following inequality may be added to the requirements for the vehicle mass calculation (FIG. 2, 108) and for the drive resistance torque calculation (FIG. 3, 156):

$$\left|\frac{dV}{dt}\right| < a_{V2} \qquad (9)$$

where $a_{V2}$ is a pre-determined threshold. Other corrections may also be added to the disclosed method without leaving the spirit of this invention to account for various factors that affect sensory data and vehicle behaviors.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a drivetrain;
   a collision avoidance system; and
   a controller programmed to adjust activation of the collision avoidance system according to a mass of the vehicle computed from a value of torque transmitted by the drivetrain measured at a first instant when the vehicle has constant speed greater than a threshold and no acceleration, and the value of torque transmitted by, the drivetrain measured at a second instant when the vehicle is accelerating.

2. The vehicle of claim 1 wherein the mass of the vehicle is computed from a difference between the value of the torque transmitted by the drivetrain measured at the first instant and the value of the torque transmitted by the drivetrain measured at the second instant.

3. The vehicle of claim 1 further comprising a collision warning system, wherein the controller is further programmed to adjust activation of the collision warning system according to the mass of the vehicle.

4. A method for operating a vehicle comprising:
   by a controller, adjusting activation of a collision avoidance system according to a mass of the vehicle computed from a value of torque transmitted by a drivetrain measured at a first instant when the vehicle has constant speed greater than a threshold and no acceleration, and the value of torque transmitted by the drivetrain measured at a second instant when the vehicle is accelerating.

5. The method of claim 4 wherein the mass of the vehicle is computed from a value of a torque transmitted by the drivetrain measured at the first instant and the value of torque transmitted by the drivetrain measured at the second instant.

6. The method of claim 4 further comprising adjusting a collision warning distance according to the mass of the vehicle.

7. The method of claim 6 further comprising generating a driver warning responsive to an actual distance to an obstacle being less than the collision warning distance.

8. The method of claim 6 further comprising decelerating the vehicle responsive to an actual distance to an obstacle being less than the collision warning distance.

\* \* \* \* \*